(12) United States Patent
Imai

(10) Patent No.: US 12,083,426 B2
(45) Date of Patent: Sep. 10, 2024

(54) VIDEO GAME WITH AUTOMATED SCREEN SHOTS

(71) Applicant: GREE, INC., Tokyo (JP)

(72) Inventor: Hitoshi Imai, Tokyo (JP)

(73) Assignee: GREE, INC., Tokyo (JP)

(*) Notice: Subject to any disclaimer, the term of this patent is extended or adjusted under 35 U.S.C. 154(b) by 0 days.

(21) Appl. No.: 18/091,734

(22) Filed: Dec. 30, 2022

(65) Prior Publication Data

US 2023/0140372 A1    May 4, 2023

Related U.S. Application Data

(63) Continuation of application No. 17/025,502, filed on Sep. 18, 2020, which is a continuation of application No. 16/027,763, filed on Jul. 5, 2018, now Pat. No. 11,020,663.

(30) Foreign Application Priority Data

Jul. 14, 2017    (JP) .................................. 2017-138253

(51) Int. Cl.
*A63F 13/00* (2014.01)
*A63F 13/25* (2014.01)
*A63F 13/52* (2014.01)
*A63F 13/30* (2014.01)
*A63F 13/833* (2014.01)

(52) U.S. Cl.
CPC .............. *A63F 13/52* (2014.09); *A63F 13/25* (2014.09); *A63F 13/30* (2014.09); *A63F 13/833* (2014.09); *A63F 2300/8029* (2013.01)

(58) Field of Classification Search
CPC .. A63F 13/497; A63F 13/525; A63F 13/5252; A63F 13/5258; A63F 13/80; A63F 13/85; A63F 13/87
See application file for complete search history.

(56) References Cited

U.S. PATENT DOCUMENTS

| | | | |
|---|---|---|---|
| 10,232,260 | B2 | 3/2019 | Hosoyamada et al. |
| 2007/0060389 | A1 | 3/2007 | Shimizu et al. |
| 2008/0139301 | A1 | 6/2008 | Holthe |
| 2012/0315984 | A1 | 12/2012 | Carrico et al. |

(Continued)

FOREIGN PATENT DOCUMENTS

| | | |
|---|---|---|
| JP | 2001-250129 A | 9/2001 |
| JP | 2001-269482 A | 10/2001 |

(Continued)

OTHER PUBLICATIONS

Sep. 28, 2023 Notice of Allowance issued in U.S. Appl. No. 17/025,502.

(Continued)

*Primary Examiner* — Lawrence S Galka
(74) *Attorney, Agent, or Firm* — Oliff PLC

(57) ABSTRACT

A system obtains game medium information associated with a game medium in a virtual space. When a predetermined event occurs, the system determines a generation condition for an image of the virtual space based on the game medium information. The system generates an image including the game medium based on the generation condition.

15 Claims, 14 Drawing Sheets

(56) References Cited

U.S. PATENT DOCUMENTS

| | | | |
|---|---|---|---|
| 2013/0165209 A1* | 6/2013 | Lemay | G07F 17/3225 463/25 |
| 2014/0094311 A1 | 4/2014 | Kikuchi | |
| 2014/0155174 A1 | 6/2014 | Laakkonen et al. | |
| 2015/0024839 A1 | 1/2015 | Zahn et al. | |
| 2017/0065889 A1 | 3/2017 | Cheng | |
| 2017/0080344 A1 | 3/2017 | Odagiri et al. | |
| 2017/0157512 A1 | 6/2017 | Long et al. | |
| 2017/0228600 A1 | 8/2017 | Syed et al. | |
| 2017/0368460 A1 | 12/2017 | Ceraldi et al. | |
| 2017/0368461 A1 | 12/2017 | Ceraldi et al. | |
| 2018/0078862 A1 | 3/2018 | Schleicher | |
| 2018/0161677 A1 | 6/2018 | Odagiri et al. | |

FOREIGN PATENT DOCUMENTS

| | | |
|---|---|---|
| JP | 2007-313001 A | 12/2007 |
| JP | 2011-206219 A | 10/2011 |
| JP | 2012-174089 A | 9/2012 |
| JP | 2014-171496 A | 9/2014 |
| JP | 2016-220847 A | 12/2016 |
| JP | 2017-56114 A | 3/2017 |

OTHER PUBLICATIONS

Jun. 21, 2023 Office Action issued in U.S. Appl. No. 17/025,502.
Aug. 4, 2020 Office Action issued in Japanese Patent Application No. 2017-138253.
Dec. 4, 2020 Office Action issued in U.S. Appl. No. 16/027,763.
Jan. 26, 2021 Office Action issued in Japanese Patent Application No. 2017-138253.
Oct. 4, 2022 Office Action issued in Japanese Patent Application No. 2021-150109.
Mar. 1, 2023 Office Action issued in Japanese Patent Application No. 2021-150109.
Jun. 30, 2023 Office Action issued in Japanese Patent Application No. 2021-150109.

* cited by examiner

Fig.2

Game Field Information

| Field ID | Field Name | Geographical Element | Size | Position Coordinates in Game Field | |
|---|---|---|---|---|---|
| F01 | Field A | Sun | (X:40 , Y:40 , Z:40) | (X:342, Y:460, Z:550) | ... |
| | | Pond | (X:50 , Y:100 , Z:30 ) | (X:539, Y:660, Z:40) | ... |
| | | ... | ... | ... | ... |
| | | Mountain | (X:30 , Y:40 , Z:100 ) | (X:630, Y:842, Z:50) | ... |
| F02 | Field B | Rainbow | (X:50 , Y:50 , Z:80 ) | (X:485, Y:738, Z:430) | ... |
| | | Waterfall | (X:20 , Y:15 , Z:90 ) | (X:365, Y:248, Z:129) | ... |
| | | ... | ... | ... | ... |
| | | Bridge | (X:50 , Y:50 , Z:20 ) | (X:720, Y:647, Z:225) | ... |
| ... | ... | ... | ... | ... | ... |

Fig.3A

Object Information (Character)

| Character ID | Character Name | Size (Height) | ... |
|---|---|---|---|
| C01 | Hero A | 160 | ... |
| C02 | Sage B | 155 | ... |
| C03 | Superpower C | 190 | ... |
| C04 | Wizard D | 170 | ... |
| S3α | Enemy S3α | 320 | ... |
| S3β | Enemy S3β | 175 | ... |
| ⋮ | ⋮ | ⋮ | ⋮ |

Fig.3B

Object Information (Body)

| Object ID | Object Name | Size (X, Y, Z) | ... |
|---|---|---|---|
| Ob01 | Secret Base | (X:258, Y:315, Z:230) | ... |
| Ob02 | Castle Gate | (X:20000, Y:40000, Z:500) | ... |
| Ob03 | Memorial Tree | (X:123, Y:134, Z:1480) | ... |
| ⋮ | ⋮ | ⋮ | ⋮ |

Fig.3C

Object Information (Activity of Character)

| Activity ID | Input Operation | Activity Content | ... | |
|---|---|---|---|---|
| Ac01 | Tap predetermined position, Swipe | Walk, Run | ... | |
| Ac02 | Double-tap | Jump | ... | |
| Ac03 | Press and hold predetermined position | Prepare for attacking | ... | |
| Ac04 | Press and hold predetermined position | Prepare for defensing / Defense | ... | |
| Ac05 | Tap predetermined position, Swipe | Attack | ... | |
| Ac06 | Tap predetermined position, Swipe | Action | ... | |
| Ac07 | Release, Tap predetermined position | Cancel action | ... | |
| Ac08 | Press and hold predetermined position | Focus | ... | |
| Ac09 | Swipe at predetermined position, Release | Throw | ... | |
| ⋮ | ⋮ | ⋮ | ⋮ | ⋮ |

Fig.4

Game History Information

| History ID | Time point | Character ID | Activity ID | Position coordinates in game field | Battle history | Health value of character | Amount of damage given to opponent | ... |
|---|---|---|---|---|---|---|---|---|
| #00000101 | 2017.06.22 09:50:32 | C01 | Ac05 | (X:3050, Y:5108, Z:12) | Hero A defeats enemy S3β | 20 | 30 | ... |
| #00000102 | 2017.06.22 09:50:34 | C01 | Ac01 | (X:3058, Y:5115, Z:45) | — | 20 | 30 | ... |
| #00000103 | 2017.06.22 09:50:35 | S3α | — | (X:3070, Y:5220, Z:10) | — | 10 | 30 | ... |
| #00000104 | 2017.06.22 09:50:36 | S3α | — | (X:3065, Y:5195, Z:20) | Hero A is defeated by enemy S1α | 0 | 30 | ... |
| ... | ... | ... | ... | ... | ... | ... | ... | ... |

Fig.5

Image Generation Condition

| Image generation condition ID | Position coordinates of viewpoint | Direction | Angle of view (focus distance) | ⋮ |
|---|---|---|---|---|
| #GAZOU00000101 | (X:2800, Y:3842, Z:125) | (X1, Y1) | 18 | ⋮ |
| #GAZOU00000102 | (X:4509, Y:8959, Z:358) | (X2, Y2) | 30 | ⋮ |
| #GAZOU00000103 | (X:3745, Y:5523, Z:254) | (X3, Y3) | 25 | ⋮ |
| #GAZOU00000104 | (X:6740, Y:4565, Z:465) | (X4, Y4) | 50 | ⋮ |
| ⋯ | ⋯ | ⋯ | ⋯ | ⋯ |

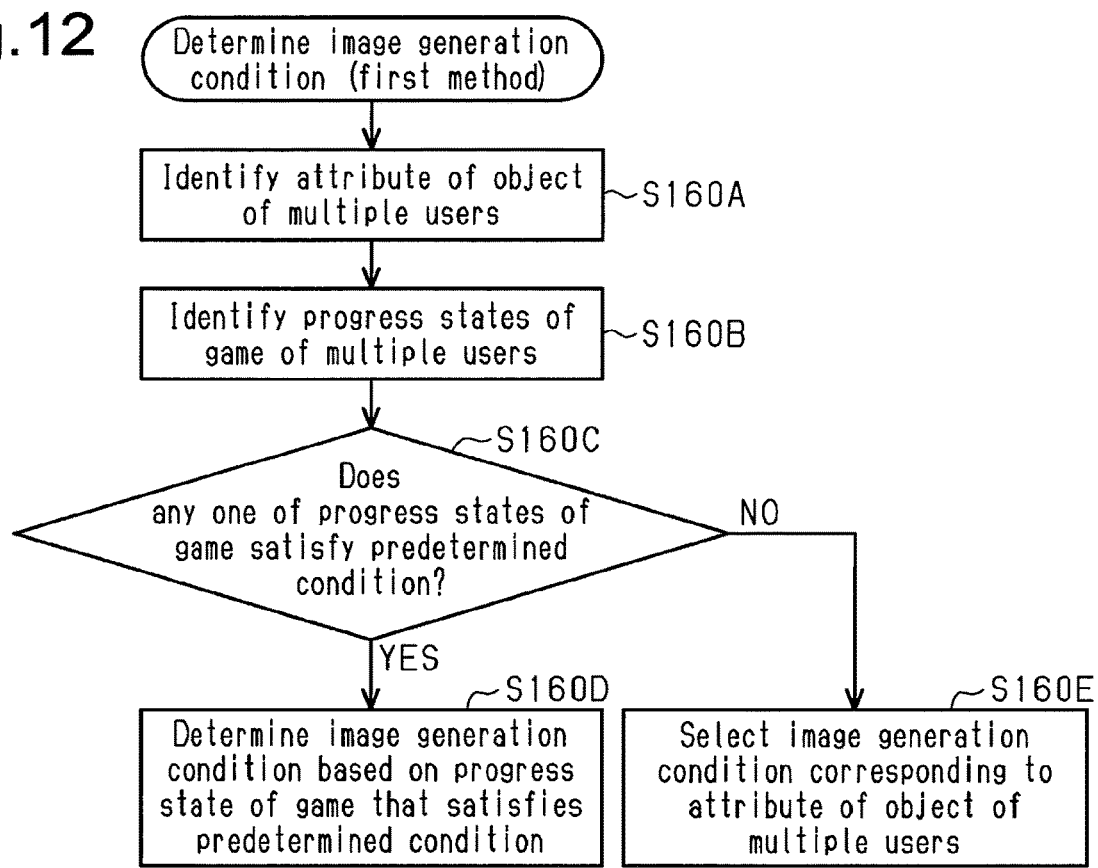
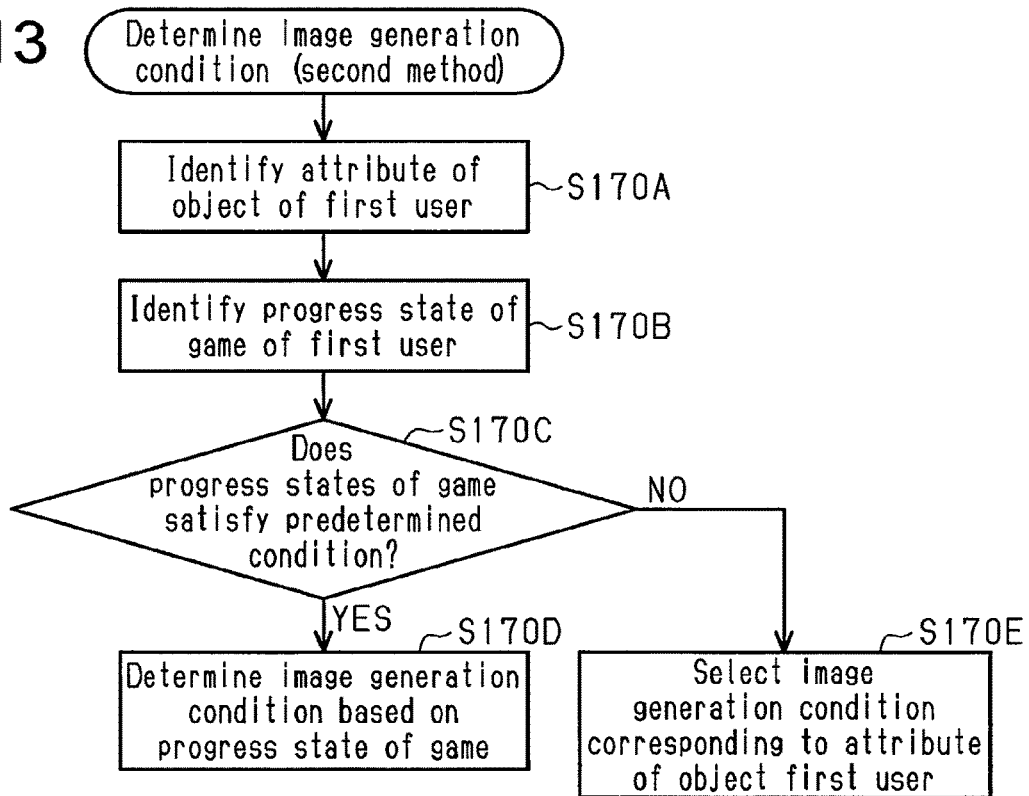

VIDEO GAME WITH AUTOMATED SCREEN SHOTS

CROSS-REFERENCE TO RELATED APPLICATION(S)

This application is a continuation of U.S. application Ser. No. 17/025,502 filed Sep. 18, 2020, which is a continuation of U.S. application Ser. No. 16/027,763 filed Jul. 5, 2018, which is based on and claims priority under 35 U.S.C. 119 from Japanese Patent Application No. 2017-138253 filed on Jul. 14, 2017. The entire contents of the above applications are incorporated herein by reference.

BACKGROUND

The present disclosure relates to a game processing program, a game processing method, and a game processing device that provide a game in which an image of a virtual space is generated.

In some known video games, a game view can be generated and saved in response to a user operation. Japanese Laid-Open Patent Publication No. 2017-56114 describes an example of a video game in which a user device operated by a user displays a game view corresponding to the user. When the user performs a photographing operation, the user device displays a photographing view, which is a game view in which an object other than the character operated by the user acts in a predetermined manner. Further, when the user performs a saving operation, a photographing view displayed on the user device is saved.

In the video game of Japanese Laid-Open Patent Publication No. 2017-56114, operation of the user triggers generation of a photographing view. Thus, especially in an action game, it is difficult to generate a photographing view while the user is playing the game. This requires interruption of game playing by the user and thus reduces the operability for the user. Additionally, such a reduced operability prevents the user from easily generating and posting a game view. Accordingly, the function to post a game view has not been in widespread use.

SUMMARY

In a game in which a game medium in a virtual space is controlled, it is an object of the present disclosure to provide a game processing program, a game processing method, and a game processing device that allow an image of the virtual space including the game medium to be generated with a simple operation.

To achieve the above object, one aspect of the present disclosure provides a non-transitory computer-readable medium that stores a computer-executable instruction. The instruction, when executed by circuitry of a system, causes the circuitry to obtain game medium information associated with a game medium in a virtual space, determine, when a predetermined event occurs, a generation condition for an image of the virtual space based on the game medium information, and generate an image including the game medium based on the generation condition.

Another aspect provides a method including obtaining, by circuitry of a system, game medium information associated with a game medium in a virtual space, determining, when a predetermined event occurs, by the circuitry, a generation condition for an image of the virtual space based on the game medium information; and generating, by the circuitry, an image including the game medium based on the generation condition.

A further aspect provides a system including circuitry. The circuitry is configured to obtain game medium information associated with a game medium in a virtual space, determine, when a predetermined event occurs, a generation condition for an image of the virtual space based on the game medium information, and generate an image including the game medium based on the generation condition.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure, together with objects and advantages thereof, may best be understood by reference to the following description of the presently preferred embodiments together with the accompanying drawings in which:

FIG. 2 is a schematic table illustrating one example of the data structure of game field information in the first embodiment;

FIGS. 3A to 3C are schematic tables each illustrating one example of the data structure of object information in the first embodiment;

FIG. 4 is a schematic table illustrating one example of the data structure of a game history in the first embodiment;

FIG. 5 is a schematic table illustrating one example of the data structure of an image generation condition in the first embodiment;

FIG. 12 is a flowchart illustrating a determination process for an image transmission condition in the second embodiment;

FIG. 13 is a flowchart illustrating a determination process for the image transmission condition in the second embodiment;

DETAILED DESCRIPTION OF THE PREFERRED EMBODIMENTS

First Embodiment

A game processing program, a game processing method, and a game processing device according to a first embodiment will now be described. In the present embodiment, the case of providing a user device 10 with a game in which characters battle with each other will be described.

[User Device 10]

The user device 10 is a computer terminal (game processing device) operated by a user. The user device 10 executes various applications and is used to output and input information.

Figure 1:
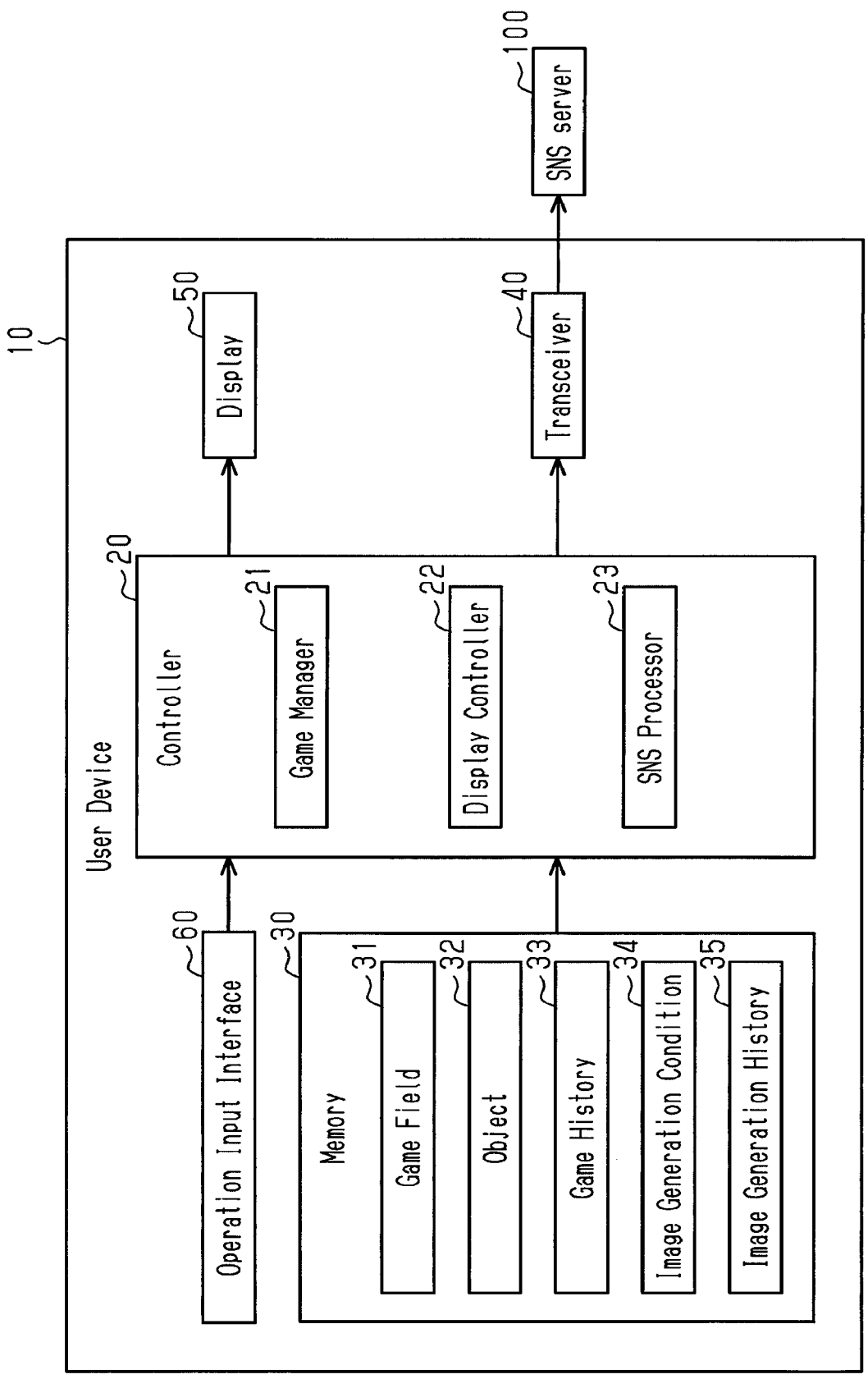
FIG. 1 is a schematic diagram illustrating the configuration of a device according to a first embodiment.

As shown in FIG. 1, the user device 10 includes a controller 20, a memory 30, a transceiver 40, and a display 50.

The memory 30 includes game field information 31, object information 32, a game history 33, an image generation condition 34, and an image generation history 35.

The game field information 31 is used to render the background of a game field, which is a three-dimensional virtual space. As shown in FIG. 2, the game field information 31 includes identification information of the game field (field ID) and attribute information of a geographic element included in the game field (for example, the type of geographic element, size, and position coordinates in the game field).

The object information 32 relates to the attribute of an object placed in the game field. As shown in FIG. 3A, the object information 32 includes information on the character placed in the game field as an object (for example, size (height) of the character). Further, as shown in FIG. 3B, the object information 32 includes information on a body placed in the game field as an object (for example, the size of the body). Further, as shown in FIG. 3C, the object information 32 includes information on an activity of the character in the game field (for example, the activity content of the character corresponding to input operation of the user). In the activity content of the character corresponding to the input operation of the user, for example, the character walks when the user taps a predetermined position and jumps when the user taps the predetermined position twice in a row (double-tap).

The game history 33 is history information of the character included in a scene of the game and is updated as the game progresses. As shown in FIG. 4, the game history 33 includes information on the type of activity of each character of the corresponding playing time point of the game (activity ID) and information on the state of each character (for example, the position coordinates in the game field, battle history, health value, and the amount of damage given to the opponent).

The image generation condition 34 defines a condition in which an image of a scene of the game is generated as a still image optimized based on the attribute of an object included in the scene during the game progress. As shown in FIG. 5, the image generation condition 34 includes information on a position serving as a viewpoint, a direction of a sight line, and the angle of view when the image of the scene of the game is generated. The image generation condition 34 differs depending on the attribute of the object included in the scene of the game. When the progress state of the game satisfies a predetermined condition (for example, the health value of the character is zero), the image generation condition 34 is determined based on the progress state of the game.

The image generation history 35 includes information on the image of the game field that has been generated based on the image generation condition 34 during the game progress.

The controller 20 functions as a game manager 21, a display controller 22, and an SNS processor 23 by executing the game processing program.

The game manager 21 receives an operation signal from an operation input interface 60 operated by the user. In response to the received operation signal, the game manager 21 identifies the state in which the character is operated by the user.

The game manager 21 manages the progress of the game by the user. More specifically, the game manager 21 moves the character in the game field based on the state of operation of the character by the user. Further, when the character operated by the user (user-operated character) approaches the character serving as a battle opponent, the game manager 21 starts a battle between the characters.

The game manager 21 holds trigger conditions for performing photographing (image generation). When an event in the game (for example, attacking, walking, or clearing of a difficult state) matches a content that is set as the trigger condition, the game manager 21 determines the image generation condition 34 based on the attribute of the object included in the scene of the game. Examples of the trigger condition include a condition in which the user-operated character performs a special attack such as a finishing move and a condition in which the user-operated character starts battling with a boss character, which is stronger than normal enemy characters (i.e., associated with a parameter value such as a higher health value or attack ability). Further, the game manager 21 generates an image of the game field based on the image generation condition 34. In addition, the game manager 21 identifies a region of the generated image other than the object included in the image as a vacant space and appends a message to the vacant space. In this case, the game manager 21 may append a set phrase as a message or append a message generated based on the game history 33. The game manager 21 adds the image of the game field including the appended message to the image generation history 35.

The display controller 22 extracts the game field information 31 corresponding to the viewpoint of the user-operated character. The display controller 22 transmits the extracted game field information 31 to a display 50 as an image signal. Further, the display controller 22 extracts images of the user-operated character and the character serving as the battle opponent from the object information 32 and transmits information corresponding to the extracted images to the display 50 as an image signal.

The SNS processor 23 executes a process for using a social networking service (SNS). The SNS processor 23 retrieves an image of the game field generated during the game progress from the image generation history 35 and transmits the image to an SNS server 100 via the transceiver 40. In this case, the SNS processor 23 may obtain a post history on an SNS and automatically select where to post based on the post history. Alternatively, the user may set on which SNS the user posts. The user may set where to post during the initial setting or when a predetermined event ends (for example, when a stage ends) in the game played by the user.

The transceiver 40 communicates with a server device or other user devices via a network.

[Game Process]

Figure 6:
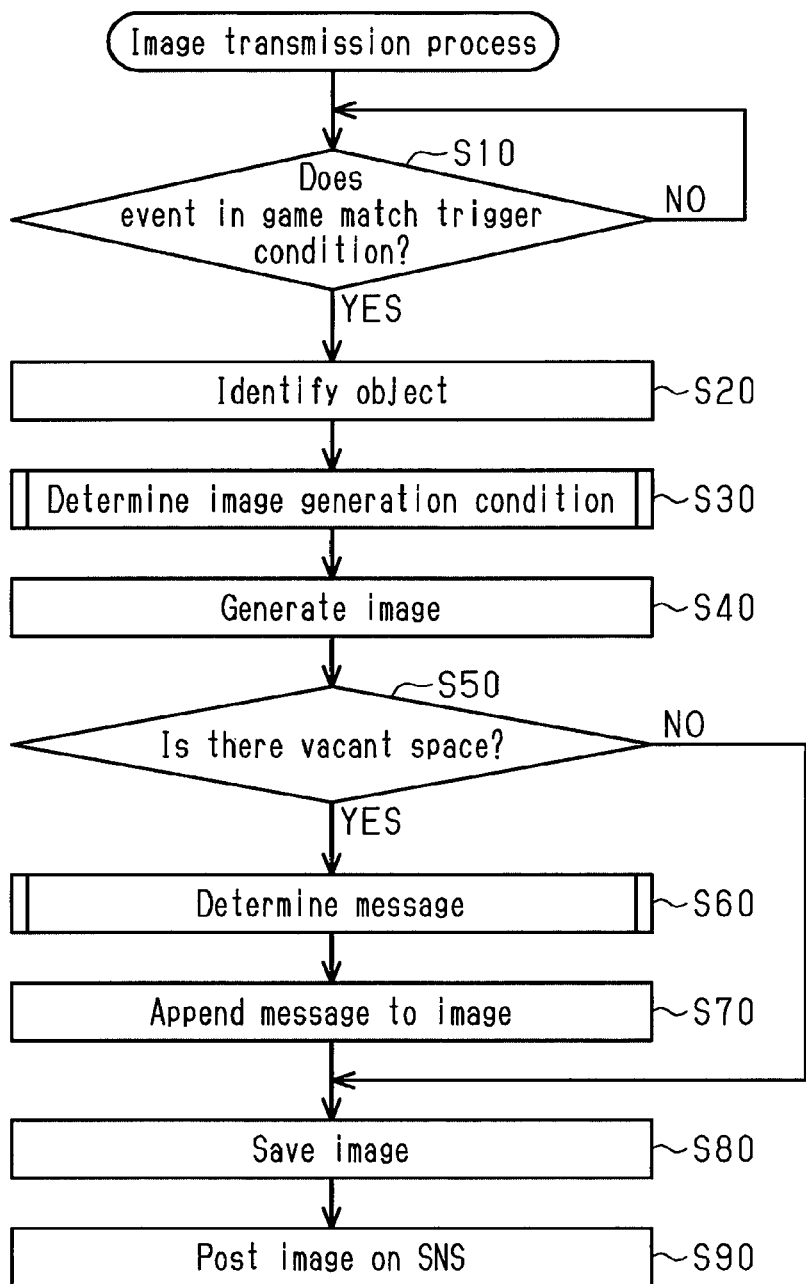
FIG. 6 is a flowchart illustrating an image transmission process in the first embodiment.

A process for transmitting an image of the game field generated during the game progress to the SNS server will now be described with reference to FIGS. 6 to 8.

The controller 20 determines whether or not the event in the game matches the trigger condition (step S10). More specifically, the game manager 21 of the controller 20 monitors a progress state of the event in the game and compares the progress state with the trigger condition set in advance.

If the progress state of the event in the game matches the trigger condition ("YES" in step S10), the controller 20 identifies an object included in the scene of the game (step S20). More specifically, the game manager 21 of the controller 20 identifies the position of the user-operated character in the game field. Further, the game manager 21 identifies other objects located in the vicinity of the position of the character based on position information in the object information 32.

Subsequently, the controller 20 determines the image generation condition 34 (step S30).

Figure 7:
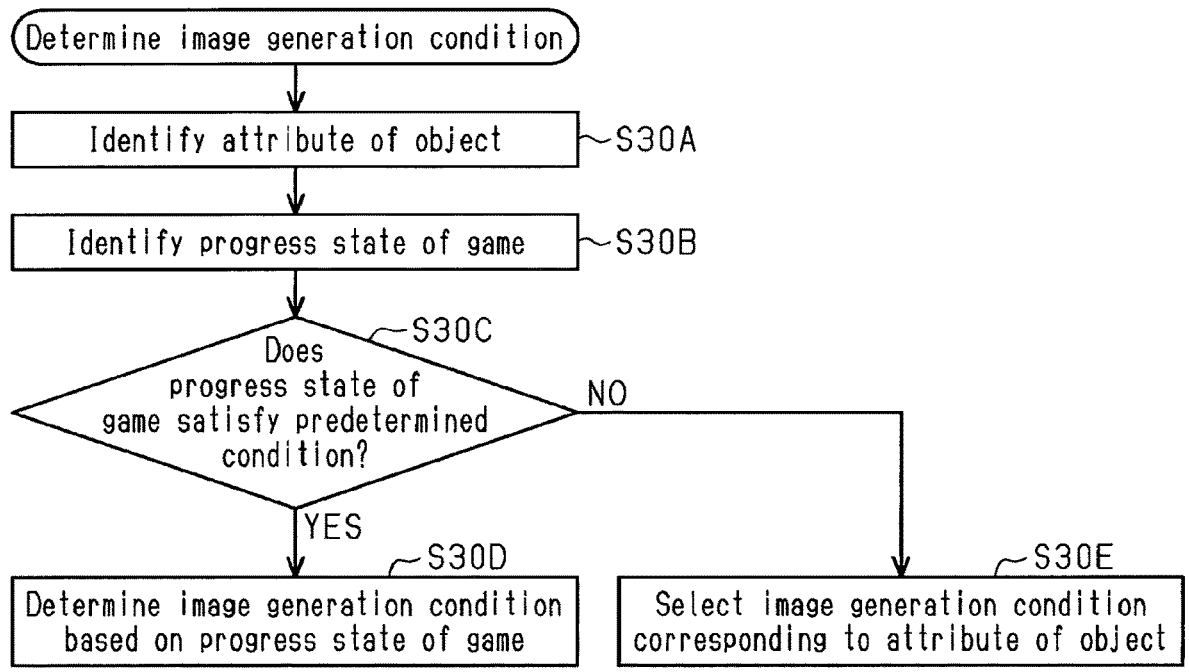
FIG. 7 is a flowchart illustrating a determination process for the image generation condition in the first embodiment.

As shown in FIG. 7, in a determination process for the image generation condition 34, the controller 20 identifies the attribute of the object (step S30A). More specifically, the game manager 21 extracts the object information 32 of the object identified in step S20 and obtains information on the character included in the scene of the game, information on a body included in the scene of the game, and information on an activity of the character.

Then, the controller 20 identifies the progress state of the game (step S30B). More specifically, the game manager 21 extracts the game history 33 of the character identified as the object in step S20 and identifies information on the state of the character included in the scene of the game.

Afterwards, the controller 20 determines whether or not the progress state of the game satisfies a predetermined condition (step S30C). More specifically, the game manager 21 determines whether or not the state of the character identified in step S30B satisfies a condition suitable for determining the image generation condition 34. For example, the condition suitable for determining the image generation condition 34 is that the health value of the character is zero.

If the progress state of the game satisfies the predetermined condition (YES in step S30C), the controller 20 determines the image generation condition 34 based on the progress state of the game (step S30D). More specifically, for example, when the health value of the character is zero, the game manager 21 of the controller 20 determines the image generation condition 34 for generating an image in which the character having a health value of zero is looked down at by setting, as a viewpoint position, the position of an enemy character serving as a battle opponent.

If the progress state of the game does not satisfy the predetermined condition ("NO" in step S30C), the controller 20 selects the image generation condition 34 corresponding to the attribute of the object (step S30E). More specifically, the game manager 21 obtains a character ID, a body ID, and an activity ID as an example of the attribute of the object included in the scene of the game and selects the image generation condition 34 corresponding to the combination of the obtained IDs.

Referring back to FIG. 6, the controller 20 generates an image of the game field (step S40). More specifically, the game manager 21 retrieves information on the viewpoint position, direction, and angle of view defined in the image generation condition 34. In the game field corresponding to the game field information 31, the game manager 21 generates an image from the viewpoint coordinates in the game field identified based on the viewpoint position.

Subsequently, the controller 20 determines whether or not there is a vacant space in the generated image (step S50). More specifically, the game manager 21 identifies a region of the image of the game field occupied by the object based on the position information in the object information 32. The game manager 21 determines whether or not there is a region in the image of the game field other than the object.

If the controller 20 determines that there is a vacant space ("YES" in step S50), the controller 20 determines a message to be displayed in the vacant space (step S60).

Figure 8:
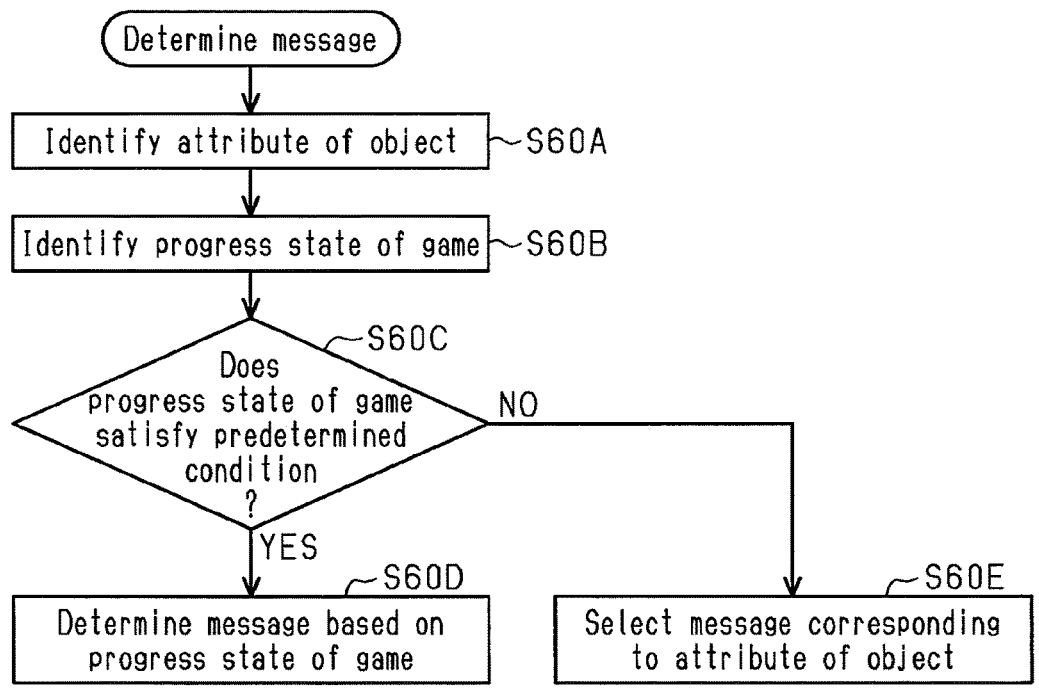
FIG. 8 is a flowchart illustrating a determination process for a message in the first embodiment.

As shown in FIG. 8, in a determination process for a message, the controller 20 identifies the attribute of the object (step S60A). More specifically, the game manager 21 extracts the object information 32 of the object identified in step S20 and obtains information on the character included in the scene of the game, information on a body included in the scene of the game, and information on an activity of the character.

Then, the controller 20 identifies the progress state of the game (step S60B). More specifically, the game manager 21 extracts the game history 33 of the character identified as the object in step S20 and identifies information on the state of the character included in the scene of the game.

Afterwards, the controller 20 determines whether or not the progress state of the game satisfies a predetermined condition (step S60C). More specifically, the game manager 21 determines whether or not the state of the character identified in step S60B satisfies a condition suitable for generating the message. For example, the condition suitable for generating the message is that there is a battle history with an enemy character and that the playing time of the game until reaching the current stage is within a limited time.

If the progress state of the game satisfies the predetermined condition ("YES" in step S60C), the controller 20 generates the message based on the progress state of the game (step S60D). More specifically, when there is a battle history with an enemy character, the game manager 21 generates a message including the number of times of battling with the enemy character (for example, "this is Xth challenge to the boss!"). Further, when the playing time of the game until reaching the current stage is within a limited time, the game manager 21 generates a message including the playing time of the game (for example, "Y hours until this stage!").

If the progress state of the game does not satisfy the predetermined condition ("NO" in step S60C), the controller 20 selects the message corresponding to the attribute of the object (step S60E). More specifically, the game manager 21 obtains a character ID, a body ID, and an activity ID as an example of the attribute of the object included in the scene of the game and selects the message corresponding to the combination of the obtained IDs.

Referring back to FIG. 6, the controller 20 appends the message to the image of the game field (step S70). More specifically, the game manager 21 appends the generated message as described above to the vacant space in the image of the game field.

If the controller 20 determines that there is no vacant space ("NO" in step S50), the controller 20 does not append the message to the image of the game field.

Subsequently, the controller 20 saves the image of the game field in the memory 30 (step S80). More specifically, when there is a vacant space in the image of the game field, the game manager 21 adds the image of the game field, to which the message is appended, to the image generation history 35. When there is no vacant space, the game manager 21 adds the image of the game field generated based on the image generation condition 34 to the image generation history 35.

Then, the controller 20 posts the image on an SNS (step S90). More specifically, the SNS processor 23 retrieves the image of the game field generated during the game progress from the image generation history 35 and transmits the image to the SNS server 100 via the transceiver 40.

The images of the game field generated during the game progress will now be described with reference to FIGS. 9A to 9D.

Figure 9A:
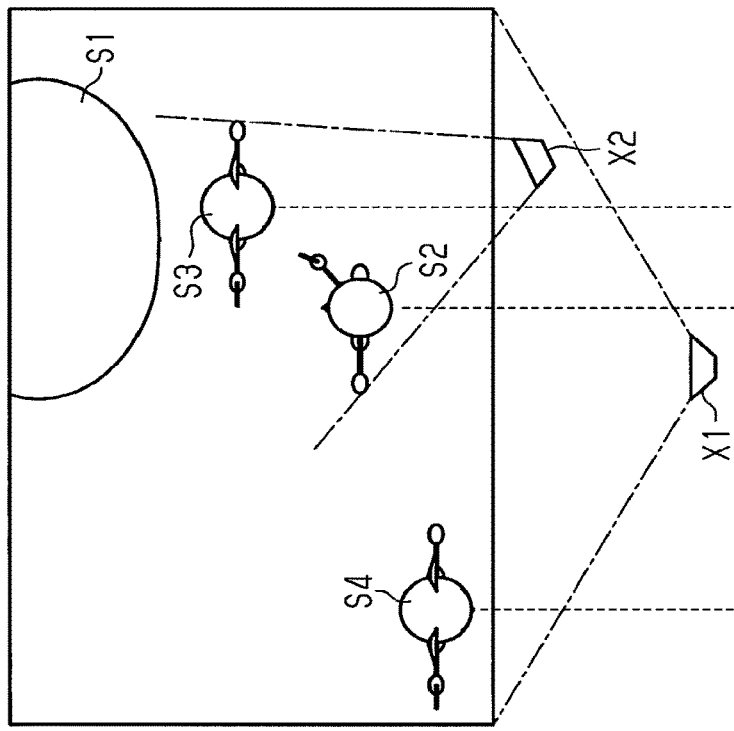
FIGS. 9A to 9D are diagrams illustrating a generation process for an image of a game field in the first embodiment.

FIG. 9A schematically shows the positional relationship of objects S1 to S4 on the game field in a scene of the game. As shown in FIG. 9A, the game manager 21 sets, as a play view, the image viewed from a virtual camera X1.

Figure 9B:
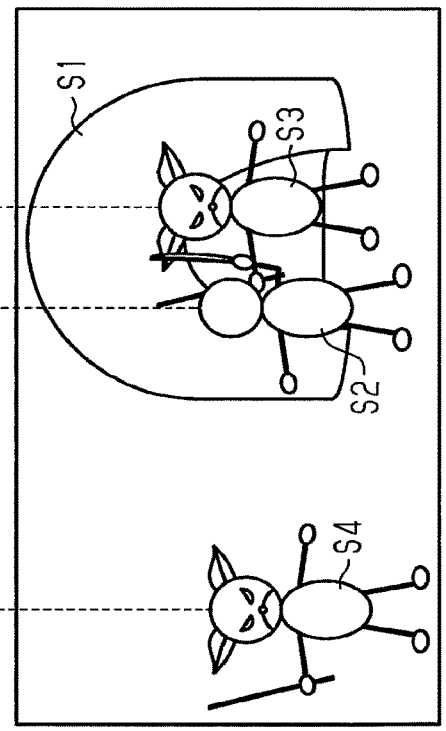

As shown in FIG. 9B, in the present embodiment, the display controller 22 displays the image in which the objects S1 to S4 on the game field are viewed from the front on the display 50 as a play view. That is, the display controller 22 controls the display 50 so as to display the image. In this case, the display controller 22 displays the object S1 (structure) placed in the game field as a body, the user-operated object S2 (ally character), and the battle opponent objects S3 and S4 (enemy characters) on the display 50.

Further, as shown in FIG. 9A, the game manager 21 sets the image viewed from a virtual camera X2 on the game field as a generated view.

Figure 9C:
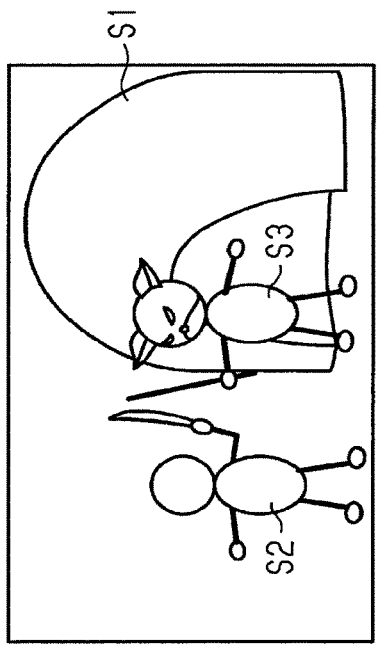

As shown in FIG. 9C, in the present embodiment, the game manager 21 sets, as a generated view, the image in which the objects on the game field are obliquely viewed with the user-operated object located in the center. In this case, the game manager 21 sets, as a generated view, the image including the user-operated object S2 (ally character) and the object S3 (enemy character) facing the object S2.

Figure 9D:
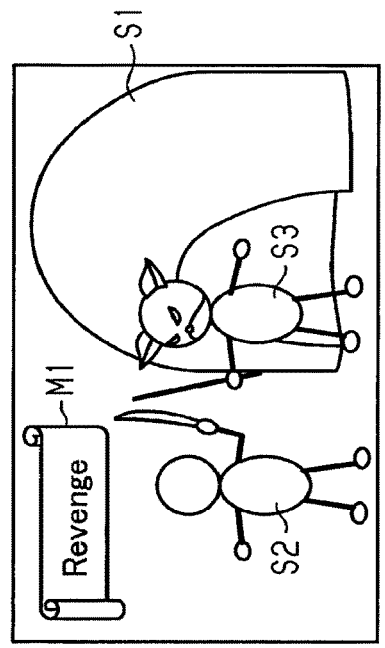

Additionally, as shown in FIG. 9D, the game manager 21 identifies the vacant space in the generated view shown in FIG. 9C and appends a message to the identified vacant space. In this case, the game manager 21 generates a message M1 based on the game history 33. More specifically, as the game progresses, when the object S2 (ally character) was previously defeated by the battling opponent object S3 (enemy character), the game manager 21 generates the message M1 reflecting the defeat. The game manager 21 appends the generated message M1 to the vicinity of the user-operated object S2 (ally character).

Another example of images of the game field generated during the game progress will now be described with reference to FIGS. 10A to 10C.

Figure 10A:
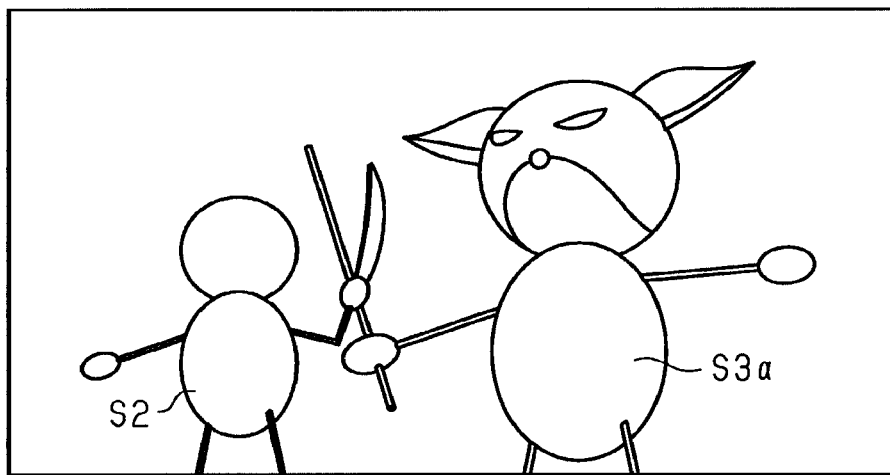
FIGS. 10A to 10C are schematic diagrams each illustrating an image of the game field in the first embodiment.

FIG. 10A shows an example in which the image generation condition 34 is determined based on the size of an object included in the scene of the game. In this case, the size of the user-operated object S2 (ally character) is smaller than that of a battling opponent object S3a (enemy character). Thus, the game manager 21 generates the image of the game field from the viewpoint in which the user-operated object S2 looks up at the battling opponent object S3a.

Figure 10B:
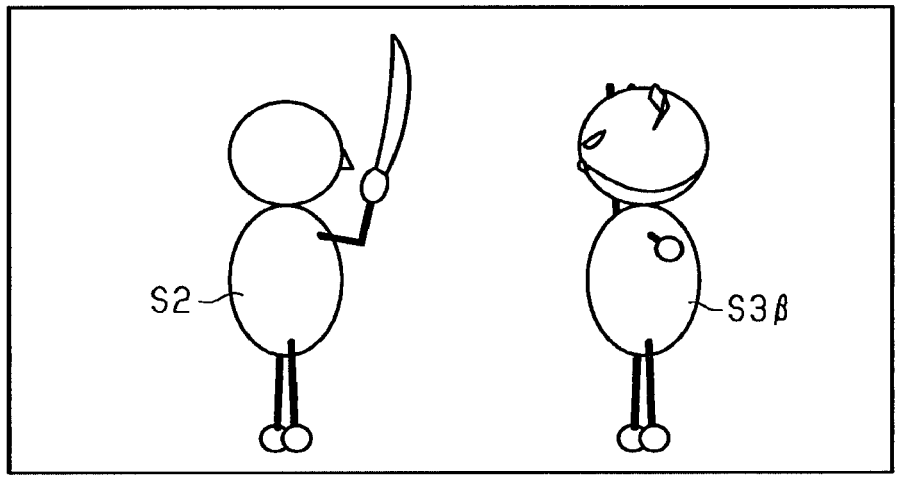

FIG. 10B shows an example in which the image generation condition 34 is determined based on the relative positions of multiple objects included in the scene of the game. In this case, the game manager 21 generates the image of the game field from the viewpoint in which the user-operated object S2 (ally character) and a battling opponent object S3β (enemy character) are viewed laterally.

Figure 10C:
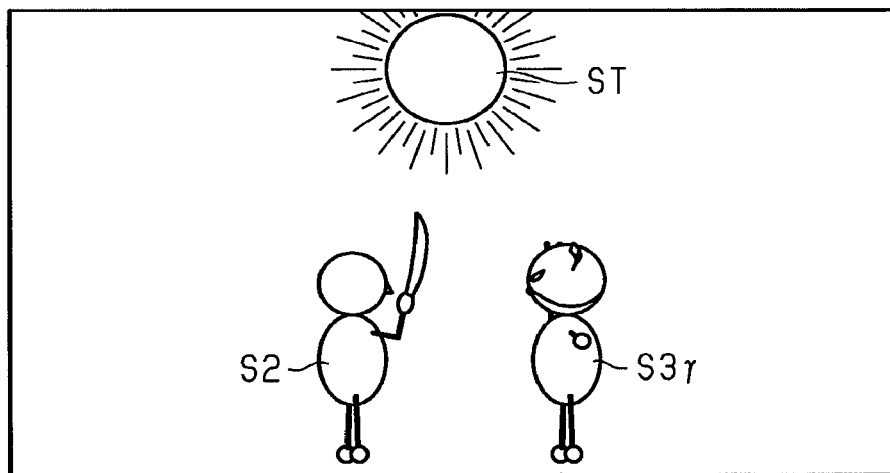

FIG. 10C shows an example in which the image generation condition 34 is determined based on the attribute of the object included in the scene of the game and the background of the game field. In this case, the game manager 21 generates the image of the game field from the viewpoint in which the user-operated object S2 (ally character) and a battling opponent object S3y (enemy character) are viewed laterally so as to include a geographic element ST (sun) serving as the background of the game field.

As described above, the first embodiment has the following advantages.

(1-1) In the first embodiment, when a scene of the game matches a content set as a trigger condition, the image generation condition 34 is determined based on the attribute of an object included in the scene of the game. The image of the game field including the object is generated based on the determined image generation condition 34. This allows the image of the game field including the object to be automatically generated without operation of the user.

(1-2) In the first embodiment, the image generation condition 34 is determined based on the size of the object included in the scene of the game, the relative positions of multiple objects, and the background of the game field. This allows a wide variety of images of the game field to be provided.

(1-3) In the first embodiment, the message M1 is displayed in a region of the image of the game field other than the object included in the image. This allows the message M1 to be displayed without interfering with the object included in the image of the game field. Further, the appending of the message to the scene of the game allows other users to easily acknowledge what the scene is. Additionally, when a message is automatically appended, the user saves time to post the message.

(1-4) In the first embodiment, the image generation condition 34 is determined based on the attribute of the object set in advance in the memory 30 and the attribute of the object that is changed when the game progresses. This allows for a wide variety of images of the game field generated based on the attribute of the object.

(1-5) In the first embodiment, the message M1 is generated based on the game history 33 that accumulates as the game progresses. This allows for a wide variety of images of the message M1 displayed in the image of the game field.

(1-6) When other users check a wide variety of posted images, users who have already played the game and users who have not played the game are both motivated to play the game.

Second Embodiment

A game processing program, a game processing method, and a game processing device according to a second embodiment will now be described. In the second embodiment, the determination process for an image generation condition and the determination process for a message in the first embodiment are partially modified. Like or same reference numerals are given to those components that are the same as the corresponding components of the first embodiment. Such components will not be described in detail.

In the game of the second embodiment, an image of the game field is generated as the game progresses in the same manner as the first embodiment. In the second embodiment, it is assumed that two users advance the game simultaneously, and the object (ally character) operated by each user is placed in a common game field. The image generation condition is determined based on the relative positions of the objects in the game field. More specifically, when the positions of the objects in the game field are proximate to each other, the image generation condition is determined so as to generate an image including both objects. When the positions of the objects in the game field are spaced apart from each other, the image generation condition is determined so as to generate an image including only the object operated by one of the users.

Figure 11:
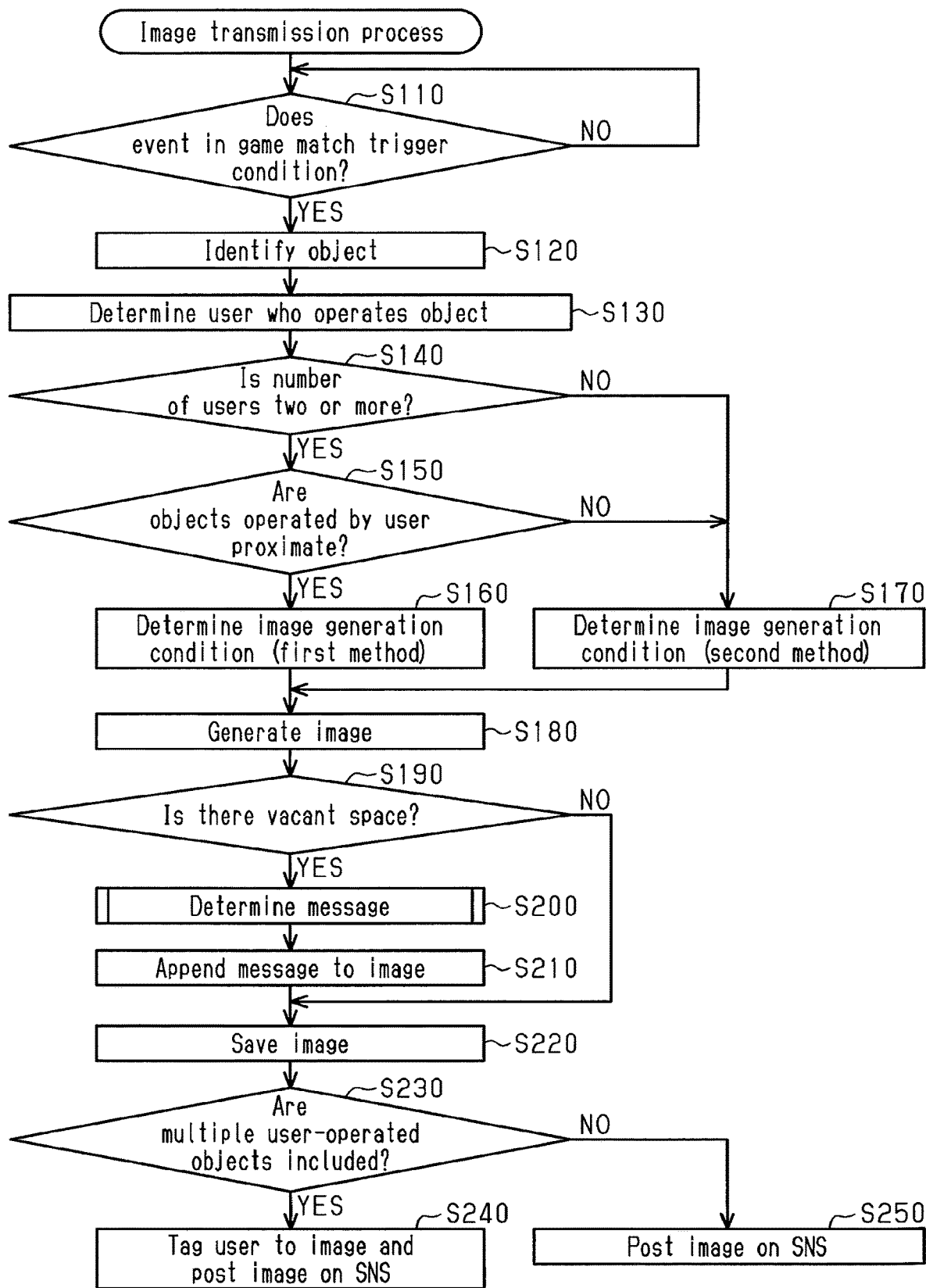
FIG. 11 is a flowchart illustrating an image transmission process in a second embodiment.

As shown in FIG. 11, the controller 20 determines whether or not the event in the game matches the trigger condition (step S110) in the same manner as step S10.

If the progress state of the event in the game matches the trigger condition ("YES" in step S110), the controller 20 identifies an object included in the scene of the game (step S120) in the same manner as step S20.

Subsequently, the controller 20 identifies the user operating each object included in the scene of the game (step S130). More specifically, the game manager 21 identifies the user operating each object by performing communication with the user devices 10 operated by other users via the transceiver 40.

Then, the controller 20 determines whether or not the number of users is two or more (step S140). More specifically, the game manager 21 calculates the number of the identified users.

If the number of the users is two or more ("YES" in step S140), the controller 20 determines whether or not the user-operated objects are proximate to each other (step S150). More specifically, the game manager 21 extracts the object information 32 of the user-operated objects and identifies the position coordinates of each object in the game field. The game manager 21 compares the distance between the objects in the game field with threshold values.

If the user-operated objects are proximate to each other ("YES" in step S150), the controller 20 uses a first method to determine the image generation condition 34 (step S160).

As shown in FIG. 12, in a determination process for the image generation condition 34 using the first method, the controller 20 identifies the attributes of objects of multiple users (step S160A). More specifically, the game manager 21 obtains information on multiple user-operated characters identified in step S130 and information on the activities of the characters based on the object information 32. Further, the game manager 21 obtains information on a body located in the vicinity of each user-operated character based on the object information 32.

Subsequently, the controller 20 identifies progress states of the game of the multiple users (step S160B). More specifically, the game manager 21 extracts the game history 33 of the multiple user-operated characters identified in step S130 and obtains information on the state of each user-operated character.

Then, the controller 20 determines whether or not any one of the progress states of the game of the user satisfies a predetermined condition (step S160C). More specifically, the game manager 21 determines whether or not at least one of the progress states of the user-operated characters identified in step S160B satisfies the condition suitable for determining the image generation condition 34.

If at least one of the progress states of the game satisfies the predetermined condition ("YES" in step S160C), the controller 20 determines the image generation condition 34 based on the progress state of the game satisfying the predetermined condition (step S160D). More specifically, when at least one of the progress states of the user-operated characters satisfies the condition suitable for determining the image generation condition 34, the game manager 21 determines the image generation condition 34 for generating an image suitable for the state of the character. In this case, the game manager 21 determines the image generation condition 34 so as to generate an image including the two user-operated characters based on the attributes of the objects of the multiple users identified in step S160A.

If the predetermined condition is not satisfied by any one of the progress states of the game ("NO" in step S160C), the controller 20 selects the image generation condition 34 corresponding to the attributes of the objects of the multiples users (step S160E). More specifically, the game manager 21 obtains character IDs, body IDs, and activity IDs as an example of the attributes of the objects of the multiple users identified in step S160A and selects the image generation condition 34 corresponding to the combination of the obtained IDs.

Referring back to FIG. 11, if the user-operated objects are spaced apart from each other ("NO" in step S150), the controller 20 uses a second method to determine the image generation condition 34 (step S170).

As shown in FIG. 13, in a determination process for the image generation condition 34 using the second method, the controller 20 identifies the attribute of an object of a first user (step S170A). More specifically, the game manager 21 obtains information on the character operated by the first user identified in step S130 (first user-operated character) and information on the activity of the character based on the object information 32. Further, the game manager 21 obtains information on a body located in the vicinity of the first user-operated character based on the object information 32.

Subsequently, the controller 20 identifies the progress state of the game of the first user (step S170B). More specifically, the game manager 21 extracts the game history 33 of the first user-operated character identified in step S130 and obtains information on the state of the first user-operated character.

Then, the controller 20 determines whether or not the progress state of the game of the first user satisfies a predetermined condition (step S170C). More specifically, the game manager 21 determines whether or not the progress state of the first user-operated character identified in step S170B satisfies the condition suitable for determining the image generation condition 34.

If the progress state of the game satisfies the predetermined condition ("YES" in step S170C), the controller 20 determines the image generation condition 34 based on the progress state of the game (step S170D). More specifically, when the progress state of the first user-operated character satisfies the condition suitable for determining the image generation condition 34, the game manager 21 determines the image generation condition 34 for generating an image suitable for the state of the character. In this case, the game manager 21 determines the image generation condition 34 in which the first user-operated character is included in the image based on the attribute of the object of the first user identified in step S170A.

If the progress state of the game does not satisfy the predetermined condition ("NO" in step S170C), the controller 20 selects the image generation condition 34 corresponding to the attribute of the object of the first user (step S170E). More specifically, the game manager 21 obtains a character ID, a body ID, and an activity ID as an example of the attribute of the object of the first user identified in step S170A and selects the image generation condition 34 corresponding to the combination of the obtained IDs.

Referring back to FIG. 11, the controller 20 generates an image of the game field (step S180) in the same manner as step S40.

Subsequently, the controller 20 determines whether or not there is a vacant space in the generated image (step S190) in the same manner as step S50.

If the controller 20 determines that there is a vacant space ("YES" in step S190), the controller 20 determines a message to be displayed in the vacant space (step S200).

Figure 14:
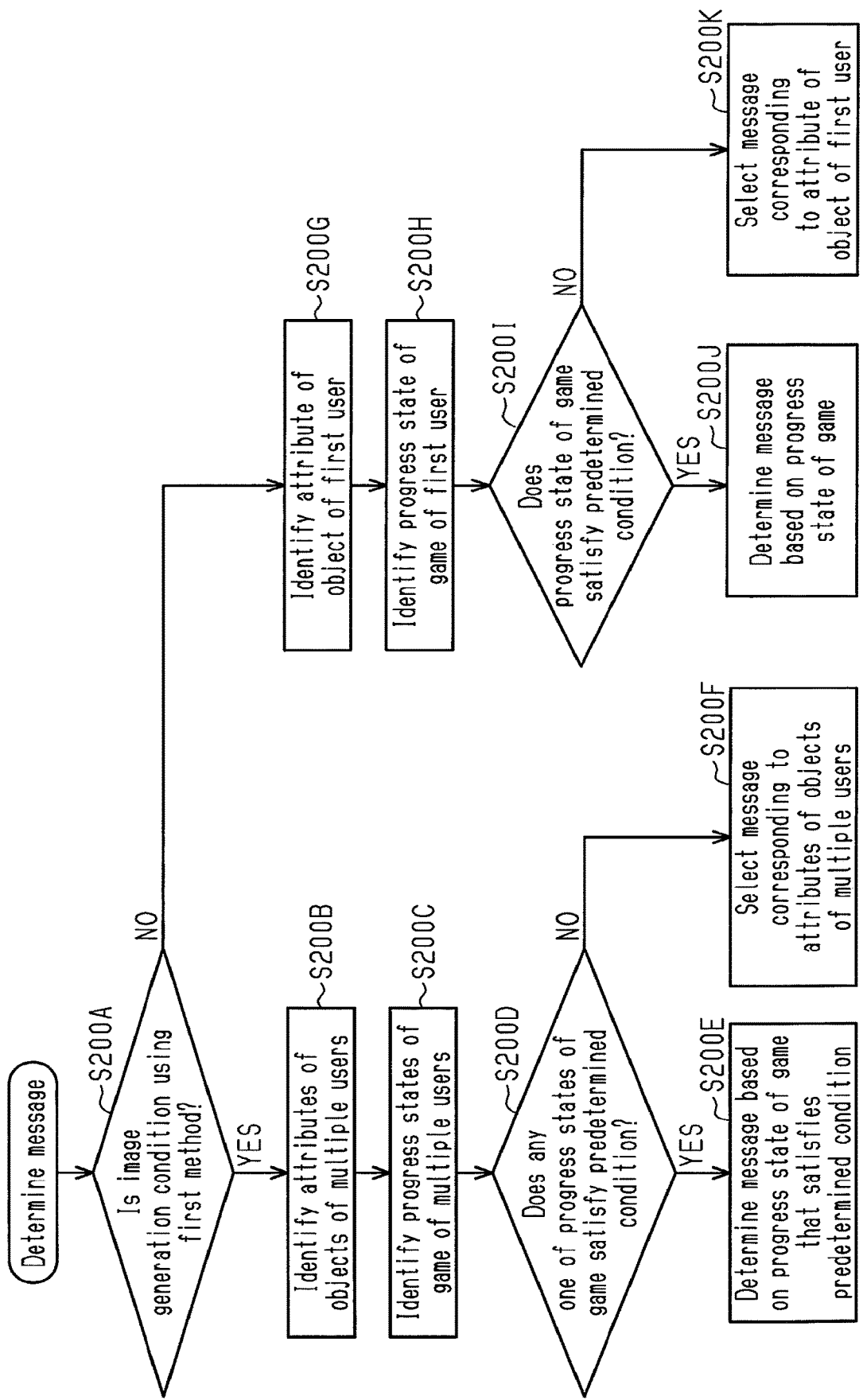
FIG. 14 is a flowchart illustrating a determination process for a message in the second embodiment.

As shown in FIG. 14, in a determination process for a message, the controller 20 determines whether or not the image generation condition 34 is determined using the first method (step S200A). More specifically, the game manager 21 determines whether or not the number of users is two or more and whether or not the user-operated objects are proximate to each other.

If the image generation condition 34 is determined using the first method ("YES" in step S200A), the controller 20 identifies the attributes of objects of multiple users (step S200B). More specifically, the game manager 21 obtains information on multiple user-operated characters identified in step S130 and information on the activities of the characters based on the object information 32. Further, the game manager 21 obtains information on a body located in the vicinity of each user-operated character based on the object information 32.

Subsequently, the controller 20 identifies the progress states of the game of the multiple users (step S200C). More specifically, the game manager 21 extracts the game history 33 of the multiple user-operated characters operated identified in step S130 and obtains information on the state of each user-operated character.

Then, the controller 20 determines whether or not any one of the progress states of the game of the user satisfies a predetermined condition (step S200D). More specifically, the game manager 21 determines whether or not at least one of the progress states of the user-operated characters identified in step S200C satisfies the condition suitable for generating the message.

If at least one of the progress states of the game satisfies the predetermined condition ("YES" in step S200D), the controller 20 generates the message based on the progress state of the game satisfying the predetermined condition (step S200E). More specifically, when at least one of the progress states of the user-operated characters satisfies the condition suitable for generating the message, the game manager 21 generates the message suitable for the state of the character.

If the predetermined condition is not satisfied by any one of the progress states of the game ("NO" in step S200D), the controller 20 selects the message corresponding to the attributes of the objects of the multiples users (step S200F). More specifically, the game manager 21 obtains character IDs, body IDs, and activity IDs as an example of the attributes of the objects of the multiple users identified in step S130 and selects the message corresponding to the combination of the obtained IDs.

Additionally, if the image generation condition 34 is not determined using the first method, that is, if the image generation condition 34 is determined using the second method ("NO" in step S200A), the controller 20 identifies the attribute of an object of the first user (step S200G). More specifically, the game manager 21 obtains information on the first user-operated character identified in step S130 and information on the activity of the character based on the object information 32. Further, the game manager 21 obtains information on a body located in the vicinity of the first user-operated character based on the object information 32.

Subsequently, the controller 20 identifies the progress state of the game of the first user (step S200H). More specifically, the game manager 21 extracts the game history 33 of the first user-operated character identified in step S130 and obtains information on the state of the first user-operated character.

Then, the controller 20 determines whether or not the progress state of the game satisfies a predetermined condition (step S200I). More specifically, the game manager 21 determines whether or not the progress state of the first user-operated character identified in step S200H satisfies the condition suitable for generating the message.

If the progress state of the game satisfies the predetermined condition ("YES" in step S200I), the controller 20 generates the message based on the progress state of the game (step S200J). More specifically, when the progress state of the first user-operated character satisfies the condition suitable for generating the message, the game manager 21 generates a message suitable for the state of the character.

If the predetermined condition is not satisfied by the progress state of the game ("NO" in step S200I), the controller 20 selects the message corresponding to the attribute of the object of the first user (step S200K). More specifically, the game manager 21 obtains a character ID, a body ID, and an activity ID as an example of the attribute of the object of the first user identified in step S130 and selects the message corresponding to the combination of the obtained IDs.

Referring back to FIG. 11, the controller 20 appends the message to the image of the game field (step S210) in the same manner as step S70.

If the controller 20 determines that there is no vacant space ("NO" in step S190), the controller 20 does not append the message to the image of the game field.

Subsequently, the controller 20 saves the image of the game field in the memory 30 (step S220) in the same manner as step S80.

Afterwards, the controller 20 determines whether or not the image of the game field includes multiple user-operated objects (step S230). More specifically, the SNS processor 23 refers to the object information 32 associated with the image of the game field to identify the user who operates each object. The controller 20 determines whether or not the number of users operating the object is two or more.

If the image of the game field includes multiple user-operated objects ("YES" in step S230), the controller 20 tags the image to the users operating the user-operated objects and posts the tagged image on the SNS (step S240). More specifically, the SNS processor 23 retrieves the image of the game field generated during the game progress from the image generation history 35 and extracts information on the users identified from the image of the game field. The SNS processor 23 associates the information on the user with the image of the game field and transmits the information to the SNS server 100 via the transceiver 40.

If the image of the game field does not include multiple user-operated objects ("NO" in step S230), the controller 20 posts the image on the SNS (step S250). More specifically, the SNS processor 23 retrieves the image of the game field generated during the game progress from the image generation history 35 and transmits the image to the SNS server 100 via the transceiver 40.

The images of the game field generated when multiple user-operated objects are proximate to each other will now be described with reference to FIGS. 15A to 15D.

Figure 15C:
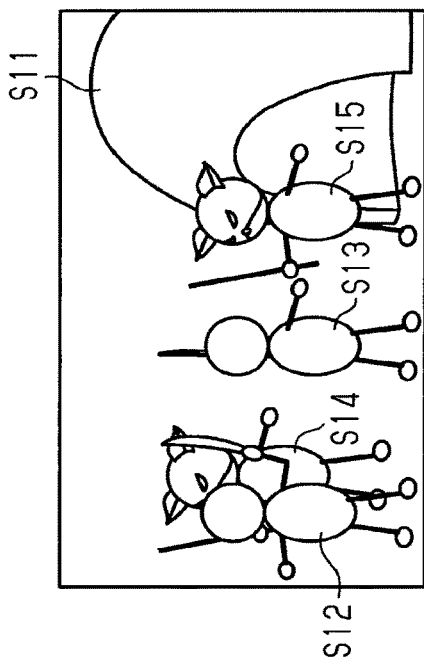
FIGS. 15A to 15D are diagrams illustrating a generation process for an image of the game field in the second embodiment.
Figure 15D:
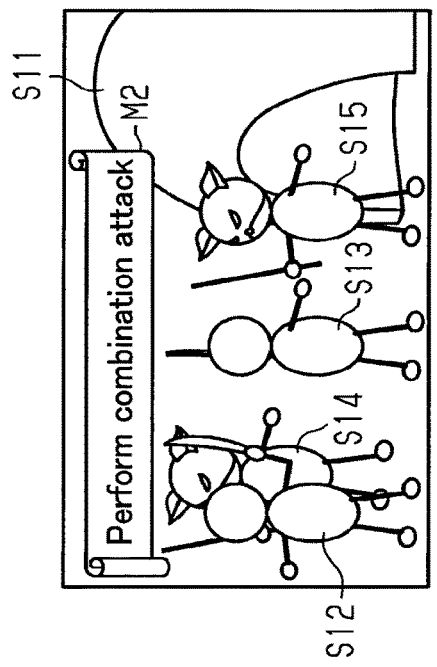
Figure 15A:
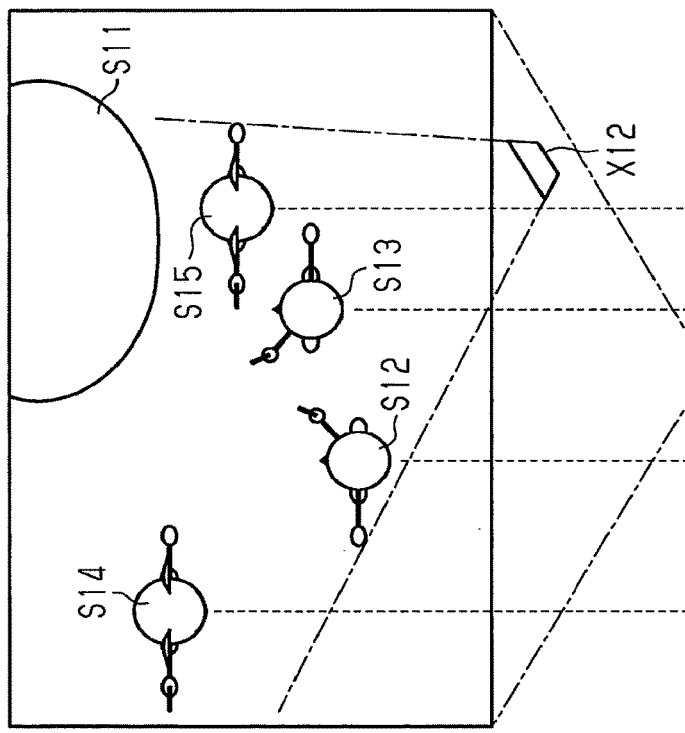

FIG. 15A schematically shows the positional relationship of objects S11 to S15 on the game field in a scene of the game. As shown in FIG. 15A, the game manager 21 sets the image viewed from a virtual camera X11 as a play view.

Figure 15B:
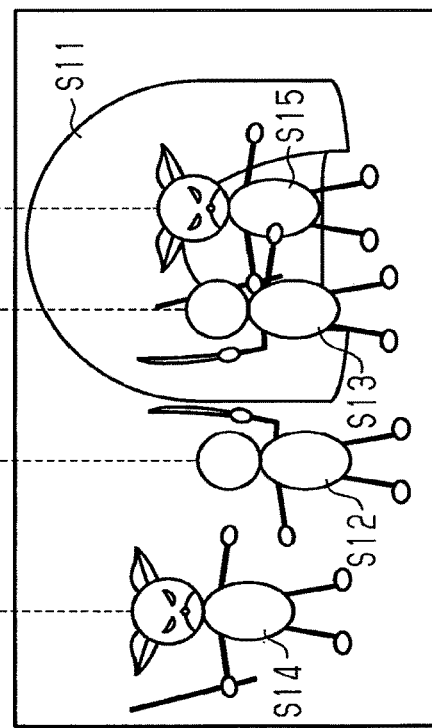

As shown in FIG. 15B, in the present embodiment, the display controller 22 displays, on the display 50 as a play view, the image in which the objects S11 to S15 on the game field are viewed from the front. In this case, the display controller 22 displays the object S11 (structure) placed in the game field as a body, the object S12 operated by the first user (first user-operated object, ally character), the object S13 operated by the second user (second user-operated object, ally character), and the battle opponent objects S14 and S15 (enemy characters) on the display 50.

Further, as shown in FIG. 15A, the game manager 21 sets, as a generated view, the image viewed from a virtual camera X12 on the game field.

As shown in FIG. 15C, in the present embodiment, the game manager 21 sets, as a generated view, the image in which the objects on the game field are obliquely viewed based on the relative positions of the first user-operated object S12 and the second user-operated object S13. In this case, the game manager 21 sets, as the generated view, the image including the first user-operated object S12 (ally character) and the second user-operated object S13 (ally character).

Further, as shown in FIG. 15D, the game manager 21 identifies the vacant space in the generated view shown in FIG. 15C and appends a message to the identified vacant space. In this case, the game manager 21 generates a message M2 based on information on the second user. More specifically, when the first-user operated object S12 (ally character) and the second user-operated object S13 (ally character) simultaneously attack the battle opponent objects S14 and S15 (enemy characters), the game manager 21 generates the message M2 reflecting the attack. The game manager 21 appends the generated message M2 to the vicinity of the first user-operated object S12.

The images of the game field generated when multiple user-operated objects are spaced apart from each other will now be described with reference to FIGS. 16A to 16D.

Figure 16A:
FIGS. 16A to 16D are diagrams illustrating a generation process for an image of the game field in the second embodiment.

FIG. 16A schematically shows the positional relationship of objects S11 to S15 on the game field in a scene of the game. As shown in FIG. 16A, the game manager 21 sets the image viewed from the virtual camera X11 as a play view.

Figure 16B:
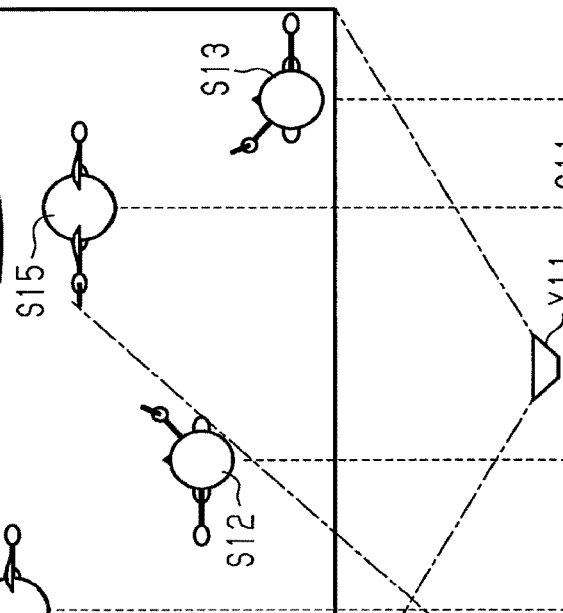

As shown in FIG. 16B, in the present embodiment, the display controller 22 displays, on the display 50 as a play view, the image in which the objects S11 to S15 on the game field are viewed from the front. In this case, the display controller 22 displays the object S11 (structure) placed in the game field as a body, the first user-operated object S12 (ally character), the second user-operated object S13 (ally character), and the battle opponent objects S14 and S15 (enemy characters) on the display 50.

Further, as shown in FIG. 16A, the game manager 21 sets, as a generated view, the image viewed from a virtual camera X13 on the game field.

Figure 16C:
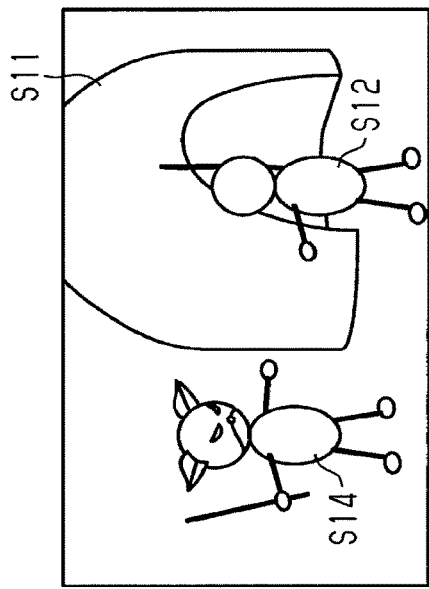

As shown in FIG. 16C, in the present embodiment, the game manager 21 sets, as a generated view, the image in which the objects on the game field are obliquely viewed based on the position of the first user-operated object S12. In this case, the game manager 21 sets, as the generated view, the image including the first user-operated object S12 (ally character) without including the second user-operated object S13 (ally character).

Figure 16D:
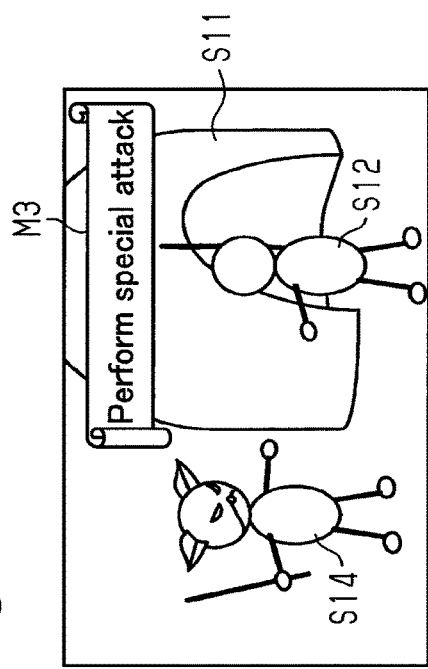

Further, as shown in FIG. 16D, the game manager 21 identifies the vacant space in the generated view shown in FIG. 16C and appends a message to the identified vacant space. In this case, the game manager 21 generates a message M3 based on the attribute of the first user-operated object S12. More specifically, when the first user-operated object S12 (ally character) performs a special attack, the game manager 21 generates the message M3 reflecting the special attack. The game manager 21 appends the generated message M3 to the vicinity of the first user-operated object S12.

As described above, the second embodiment has the following advantages in addition to the advantages of the first embodiment.

(2-1) In the second embodiment, the image generation condition 34 is determined so that multiple user-operated objects in the game field are included in an image. This allows the image of the game field to be generated so as to indicate the relationship of the objects in the scene of the game.

(2-2) In the second embodiment, multiple user-operated objects included in an image are determined based on the relative positions of the objects. Thus, the combination of the objects included in the image of the game field can be changed depending on the scene of the game.

(2-3) In the second embodiment, other users who operate objects included in a scene of the game are identified, the identified users are tagged to an image, and the tagged image is transmitted to the SNS server 100. This allows the image of the game field, in which multiple users are associated with each other, to be transmitted and thus spreads the image of the game field on the SNS.

(2-4) In the second embodiment, a wide variety of posted images are checked by other users on the SNS. This motivates them to play the game.

Each of the above embodiments may be modified as described below.

In the description of the second embodiment, the game in which two users play the game is provided. Instead, a game in which three or more users play the game may be provided. In this case, when three or more user-operated objects are proximate to each other, the controller 20 may determine the image generation condition 34 so that the image includes all the objects. This allows for generation of an image of the game field that can gain sympathy of many users.

In the second embodiment, other users operating the object S13 included in the scene of the game are tagged to the image, and the tagged image is transmitted to the SNS server 100. The transmission of the image of the game field may not involve tagging other users to the image. For example, the controller 20 may transmit the image of the game field to a shared folder of an external server, which is shared among multiple users. Further, the controller 20 may change the SNS server 100, to which the image of the game field is transmitted, for each of the users. This facilitates each user to manage the image of the game field. As a result, each user views the image of the game field more frequently and is thus motivated to play the game.

In the second embodiment, objects to be included in the image are determined based on the relative positions of multiple user-operated objects. The objects to be included in the image do not have to be determined based on the relative positions of multiple user-operated objects. For example, the controller 20 may set priority as the attribute of an object and determine the image generation condition 34 so as to generate the image having the highest priority. Further, the controller 20 may determine the image generation condition 34 without taking into consideration the relative positions of multiple user-operated objects in the game field. In this case, the controller 20 may determine the image generation condition 34 so as to generate the image including multiple user-operated objects. Thus, regardless of the relative positions of multiple user-operated objects in the game field, an image in which multiple users are forming a party and playing the game can be generated. When such an image is posted on the SNS, a person viewing the image is motivated to play the game. Alternatively, the controller 20 may determine the image generation condition 34 so as to generate an image including only one of the user-operated objects. Thus, regardless of the relative positions of multiple user-operated objects in the game field, an image in which a single user is uniquely playing the game can be generated. When such an image is posted on the SNS, a person viewing the image is motivated to play the game.

In each of the above embodiments, a message is generated based on the game history 33, which accumulates as the game progresses. The message does not have to be generated based on the game history 33. For example, the controller 20 may generate a message based on an activity history of the user obtained through an information processing terminal, for example, a posting history on the SNS and a browsing history on the internet. This allows for generation of a message matching features of the user.

In each of the above embodiments, a message is displayed in a region of the image of the game field other than the object in the image. The display position of a message does not have to be determined based on a region of the image occupied by the object. For example, the controller 20 may narrow down the display position of the message in a vacant space of the image of the game field based on the attribute of the object. This optimizes the display position of the message and increases the effect of rendering the game. Further, the controller 20 may determine the display position of the message based on the attribute of the object without taking into consideration the region of the image occupied by the object. This allows the message to be displayed without limiting the number of characters.

In each of the above embodiments, a message is appended to the image of the game field when there is a vacant space. The controller 20 does not have to append a message to the image of the game field regardless of whether or not there is a vacant space. This prevents the image of the game field from being interfered with by a displayed message and thus avoids situations in which the message lowers the high artistry of the image of the game field such as an image photographed by a photographer.

In each of the above embodiments, the parameter related to a user-operated object (for example, the position and size of the object) is applied as the attribute of the object used to determine the image generation condition 34. Instead, the type of an item used for battle by the user-operated object (for example, an ax and a bow) may be applied as the attribute of the object used to determine the image generation condition 34. In this case, a region influenced by the effect of the item may be factored in the image generation condition. For example, subsequent to the image illustrating the moment the character draws an arrow with a bow, the angle of view may be enlarged so as to generate an image including both the character, which drew the bow, and the shot arrow. In contrast, in the case of an item held by the character when in use (for example, an ax), the image can be generated in the angle of view approaching the character. This allows a wider variety of images of the game field to be generated.

In each of the above embodiments, the information on the position, direction, and angle of view serving as the viewpoint when generating an image is determined as the image generation condition 34 based on the attribute of the object included in the scene of the game. That is, the composition when generating an image is determined based on the attribute of the object included in the scene of the game. The information determined as the image generation condition 34 is not limited to information on the composition of an image. For example, the controller 20 may determine the timing of generating an image as the game progresses based on the attribute of the object included in the scene of the game. In this case, the controller 20 may determine the timing of generating an image in addition to the composition of the image based on the attribute of the object included in the scene of the game. Alternatively, whereas the player manually sets the composition of the image, the controller 20 may determine the timing of generating an image based on the attribute of the object. As another option, whereas the controller 20 automatically determines the image generation condition 34 based on the attribute of the object, the player may manually determine a message subject to display. Conversely, whereas the player manually sets the image generation condition 34, the controller 20 may automatically determine a message subject to display based on the attribute of the object.

In each of the above embodiments, the image of the game field is generated as a still image. Instead, the image of the game field may be generated as a moving image. Thus, a further realistic, appealing image of the game field can be posted on the SNS.

In each of the above embodiments, at least some of the operations and processes executed by the user device may be executed by a server device connected to the user device. For example, any one of the server device and the user device may execute the processes of, for example, display control on various views displayed in the user device and control on various GUIs. As another option, the server device and the user device may cooperate to execute the processes of display control on various views and control on various GUIs. For example, some of the various game views may be displayed by the user device based on the data generated by the server device (i.e., web view), and other game views may be displayed by a native application, which is installed in the user device (i.e., native view). In this manner, the game according to each of the above embodiments may be a hybrid game in which the server device and the user device are each in charge of some of the processes.

An information processing device such as a computer or a mobile phone may be used in a preferred manner in order for the information processing device to function as the server device or the user device according to each of the above embodiments. Such an information processing device can be implemented by storing, in a memory of the information processing device, a program describing the processing content that implements the functions of the server device or the user device according to the embodiments and then reading and executing the program with the CPU of the information processing device.

In the description of each of the above embodiments, the case of providing the game in which objects battle with each other is described as an example of a game. The present disclosure may be applied to other games such as a simulation game in which the player progresses in the game field from the viewpoint of objects placed in the game field. That is, as long as the game controls objects in the game field, the present disclosure may be applied.

The controller 20 is not limited to one that performs software processing on all processes executed by itself. For example, the controller 20 may be equipped with a dedicated hardware circuit (e.g., application specific integrated circuit: ASIC) that performs hardware processing on at least some of the processes to be executed by itself. That is, the controller 20 may be configured as 1) one or more processors that operate in accordance with a computer program (software), 2) one or more dedicated hardware circuits that execute at least some of the various processes, or 3) circuitry including combinations thereof. The processor includes a CPU and memories such as a RAM and a ROM, and the memory stores program codes or instructions configured to cause the CPU to execute the processing. The memories, that is, computer-readable media, include any type of media that are accessible by general-purpose computers and dedicated computers.

The invention claimed is:

1. A non-transitory computer-readable medium that stores a computer-executable instruction, wherein the instruction, when executed by circuitry of a system, causes the circuitry to:
    obtain game object information associated with a first game object in a virtual space of a game;
    in response to a predetermined event occurring, determine a generation condition for an image of the virtual space and the first game object based on the game object information;
    automatically generate the image based on the generation condition by automatically photographing the virtual space and the first game object; and
    automatically transmit the generated image to a social networking service (SNS) for SNS posting, wherein the instruction further causes the circuitry to
        obtain an SNS posting history; and
        automatically select a destination for the SNS posting based on the SNS posting history.

2. The non-transitory computer-readable medium according to claim 1, wherein the instruction further causes the circuitry to
    select the destination for the SNS posting based on a user setting.

3. The non-transitory computer-readable medium according to claim 1, wherein
    the first game object is operated by a first user.

4. The non-transitory computer-readable medium according to claim 3, wherein the instruction further causes the circuitry to
    determine whether the first game object, operated by the first user, and a second game object, operated by a second user, are both included in the generated image; and
    in response to determining that both the first game object and the second game object are included in the generated image, associate the first and second users with the generated image and transmit the generated image to the SNS for the SNS posting.

5. The non-transitory computer-readable medium according to claim 4, wherein
    the first and second users are associated with the generated image by tagging information on the first and second users to the generated image.

6. The non-transitory computer-readable medium according to claim 1, wherein
    the generation condition includes how the image is to be generated.

7. The non-transitory computer-readable medium according to claim 6, wherein
    the generation condition includes information on a viewpoint position, a line of sight direction, and/or an angle of view for the image.

8. The non-transitory computer-readable medium according to claim 1, wherein
    the game object information includes a priority set for the first game object, and
    the generation condition is determined such that the image is generated based on the first game object having a highest priority among a plurality of game objects in the virtual space.

9. The non-transitory computer-readable medium according to claim 4, wherein
    the generation condition is determined without taking into consideration relative positions of the first and second game objects in the virtual space.

10. The non-transitory computer-readable medium according to claim 1, wherein the instruction further causes the circuitry to
    generate a message; and
    display the message in the generated image.

11. The non-transitory computer-readable medium according to claim 10, wherein
    the message is generated based on game history data of the game.

12. The non-transitory computer-readable medium according to claim 10, wherein
    the message is generated based on an activity history of the first user outside of the game.

13. The non-transitory computer-readable medium according to claim 12, wherein
    the activity history includes the SNS posting history of the first user and/or an Internet browsing history of the first user.

14. A method comprising:
    obtaining game object information associated with a first game object in a virtual space of a game;
    in response to a predetermined event occurring, determining a generation condition for an image of the virtual space and the first game object based on the game object information;
    automatically generating the image based on the generation condition by automatically photographing the virtual space and the first game object; and
    automatically transmitting the generated image to a social networking service (SNS) for SNS posting, wherein the method further comprises
        obtaining an SNS posting history; and
        automatically selecting a destination for the SNS posting based on the SNS posting history.

15. A system including circuitry, wherein the circuitry is configured to:
    obtain game object information associated with a first game object in a virtual space of a game;
    in response to a predetermined event occurring, determine a generation condition for an image of the virtual space and the first game object based on the game object information;
    automatically generate the image based on the generation condition by automatically photographing the virtual space and the first game object; and
    automatically transmit the generated image to a social networking service (SNS) for SNS posting, wherein the circuitry is further configured to
        obtain an SNS posting history; and
        automatically select a destination for the SNS posting based on the SNS posting history.

* * * * *